United States Patent [19]

Johnson

[11] 4,414,701

[45] Nov. 15, 1983

[54] DEVICE FOR CLEANING A HOSE COUPLING

[76] Inventor: Douglas J. Johnson, 4455 N. Dickenson Ave., Fresno, Calif. 93711

[21] Appl. No.: 399,423

[22] Filed: Jul. 19, 1982

[51] Int. Cl.[3] .......................... B08B 9/02; B23G 5/00

[52] U.S. Cl. .................................. 15/105; 15/104.04; 15/236 R; 10/1 B; 29/402.02

[58] Field of Search ..................... 15/104.04, 105, 111, 15/236 R, 104.02; 408/68, 221; 10/1 B; 29/402.02, 402.15

[56] References Cited

U.S. PATENT DOCUMENTS

| | | | |
|---|---|---|---|
| 984,577 | 2/1911 | Maglenn . | |
| 2,125,653 | 8/1938 | Seguin . | |
| 2,567,480 | 9/1951 | Heldenbrand | 10/1 B |
| 2,700,166 | 1/1955 | McKenzie | 10/1 B |
| 4,301,567 | 11/1981 | Tucker . | |

FOREIGN PATENT DOCUMENTS

| | | | |
|---|---|---|---|
| 1031561 | 6/1966 | United Kingdom | 15/104.04 |

*Primary Examiner*—Edward L. Roberts
*Attorney, Agent, or Firm*—Huebner & Worrel

[57] ABSTRACT

A device for cleaning a hose coupling having external screw threads and an adjacent concentric, axially disposed face, the device having an externally graspable tubular element provided toward one end with internal, interrupted screw threads mating with the screw threads of the coupling and having an extension mounted on the tubular element for rotation relative to such element about the axis of its screw threads, the extension having a graspable portion projecting from the other end of the tubular element and a portion extended within the tubular element from such end and bearing a diametrically extended edge disposed for cleaning the face of the coupling when the tubular element has been screwed onto the coupling to clean the coupling screw threads with the interrupted screw threads.

5 Claims, 4 Drawing Figures

DEVICE FOR CLEANING A HOSE COUPLING

BACKGROUND OF THE INVENTION

1. Field of the Invention

The present invention relates to a device for cleaning a hose coupling or the like, and more particularly to such a device for cleaning the external screw threads and the adjacent axially disposed, annular face of a coupling, such as a garden hose coupling, as commonly found in faucets, taps, hose cocks, bibs and the like.

2. Description of the Prior Art

Hose couplings, specifically the well-known male couplings used with garden hoses, have external screw threads and axially adjacent annular and planar faces, the screw threads serving to draw corresponding female couplings into sealing engagement with the faces. Since the male coupling is usually fully exposed, it becomes dirty and corroded and frequently calcifies. As a result, considerable friction or actual obstruction develops between the screw threads of such a coupling and a female coupling requiring excessive effort to connect the couplings in fluid-tight relation. Also, due to such dirt, corrosion and calcification, the annular face loses its regular shape so that leakage occurs even when the couplings are tightened. It is, of course, possible to use a wrench and a threading die which is of the usual configuration having interrupted, internal screw threads, to clean the threads of the male coupling and to clean the annular face thereof with a file or the like. However, the use of such tools is inconvenient. Also, with such tools, there is no provision for bringing the annular face of the male coupling into its proper configuration lying in a plane substantially normal to the axis of the adjacent external screw thread.

It is therefore highly desirable to provide a device which is economical and convenient to use in cleaning a hose coupling so as to minimize leakage and to minimize exertion in connecting the coupling to a mating coupling.

PRIOR ART STATEMENT

The following patents, copies of which are enclosed together with Form PTO-1449, are submitted in conformance with 37 C.F.R. §1.97 and §1.98 and characterize the closest prior art of which the applicant is aware:

Maglenn—U.S. Pat. No. 984,577—Feb. 21, 1911

Seguin—U.S. Pat. No. 2,125,653—Aug. 2, 1938

Tucker—U.S. Pat. No. 4,301,567—Nov. 24, 1981

The patent to Tucker, U.S. Pat. No. 4,301,567, is believed relevant in its disclosure of a device for cleaning an axially disposed face and an adjacent frusto-conical surface of a battery terminal by, respectively, a flat brush and a substantially cylindrical brush. The flat brush is arranged to slide axially of the cylindrical brush, but is specifically restrained from rotating relative to it by a key received in the slot.

The Maglenn U.S. Pat. No. 984,577 is believed relevant in its disclosure of a device having interrupted internal screw threads for cleaning external screw threads. The device is not adapted also to clean an axially facing annular surface and has also no relatively rotating, coaxially related elements.

The Seguin U.S. Pat. No. 2,125,653 is believed relevant in its disclosure of a device for cleaning an axially facing annular surface adjacent to external screwthreads. However, the device is not adapted to clean the screw threads and has no relatively rotating, coaxially related elements.

SUMMARY OF THE INVENTION

It is an object of the subject invention to provide an improved device for cleaning a hose coupling or the like having screw threads and an adjacent axially disposed sealing face.

Another object is to provide such a device wherein the screw threads serve to position the device to clean such a face having a predetermined relation to the axis of the screw threads.

Another object is to provide such a device which is convenient to use and to carry.

Another object is to provide such a device which is manually actuated and requires little effort effectively to clean such screw threads and such face.

A further object is to provide improved elements and arrangements thereof in a device for cleaning hose couplings and the like which is low in cost, dependable and durable, and is fully effective in carrying out its intended purposes.

DESCRIPTION OF THE PREFERRED EMBODIMENT

Figure 1:
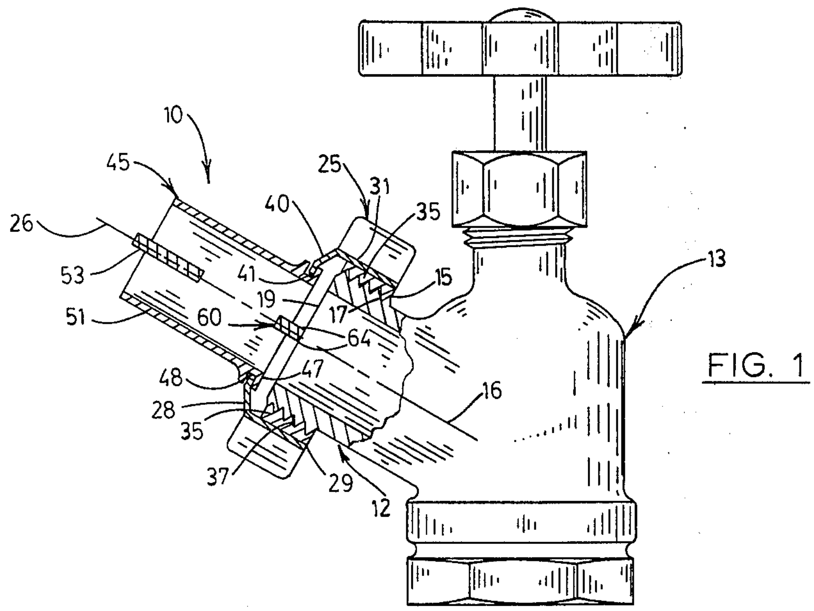
FIG. 1 is a diametric section of a device which embodies the principles of the subject invention and is for cleaning a hose coupling, the device being depicted in cleaning engagement with such a coupling which is partially diametrically sectioned and is a portion of a valve.
Figure 4:
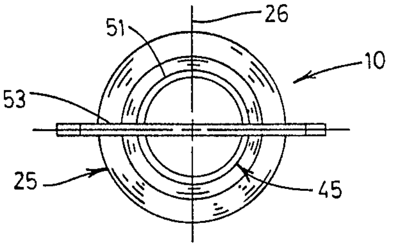
FIG. 4 is an axial view of the device from a direction opposite to that of FIG. 3.
Figure 2:
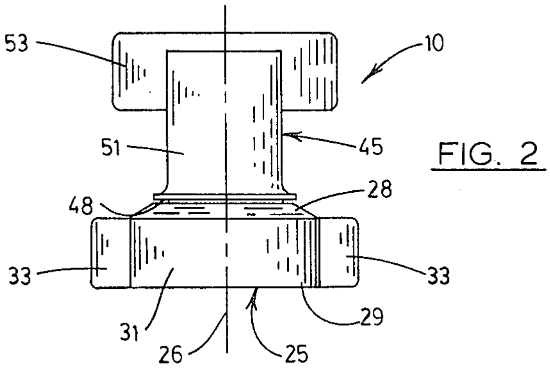
FIG. 2 is an exterior view of the device of FIG. 1 with coaxially related, relatively rotating elements thereof in alternate position from that shown in FIG. 1.
Figure 3:
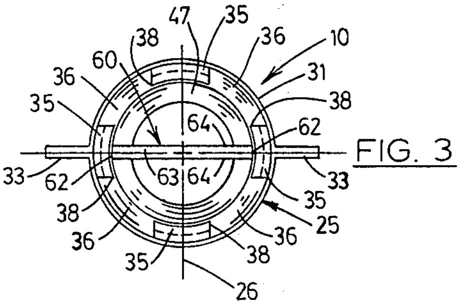
FIG. 3 is an axial view of the device with such elements in their relative positions shown in FIG. 2.

Referring with greater particularity to the drawings, the figures show a device 10 for cleaning a male hose coupling 12 or the like. The coupling is depicted in FIG. 1 in a typical arrangement in which the coupling is a unitary portion of the body of a valve 13 of well-known construction. The coupling has external screw threads 15 circumscribing a predetermined axis 16 of the coupling. The screw threads define a helical or screw thread surface 17 which circumscribes this axis. The coupling has a planar, annular and axially disposed face 19 which is axially adjacent to the screw threads and is circumscribed thereby. The face has a predetermined relation to the axis, being coaxially related to the screw threads and lying substantially in a plane normal to such axis.

The device 10 has a thread cleaning element 25 which is referred to in the claims as a first element of the device. This element is cylindrically tubular about a predetermined axis 26 of the device and has a predetermined first axial end 28 and an opposite and axially open second axial end 29. This element has a cylindrical sleeve 31 extended between these ends about such axis, the internal diameter of the sleeve being somewhat greater than the major diameter of the screw threads 15 of the coupling 12. The thread cleaning element is provided with a pair of wings 33 mounted rigidly and externally on the sleeve and extended diametrically oppositely therefrom. The first element is thus graspable, manually or by any suitable tool, for rotation about such axis. This element has internal screw threads 35 mounted within the sleeve and adapted to mate with the screw threads of the coupling. The internal screw threads are disposed in circumscribing relation about such predetermined axis of the device. These internal screw threads are interrupted, as indicated by the numeral 36, in the well-known manner of the screw threads of a screw threading die and extend axially from the second axial end of the thread-cleaning element toward its first axial end. It is evident these interrupted screw threads define a helical or screw thread surface 37 of the thread cleaning element and that this surface mates with the coupling surface 17 and circumscribes the axis of the device. It is also evident that each of the interruptions defines a cleaning edge 38 in the helical surface, each such edge being disposed to engage the coupling surface in cleaning relation when the first element surface is disposed at the coupling and the axes of the device and of the coupling are substantially coincident.

The element 25 has an annular lip 40 extended radially inwardly from the sleeve 31 at the first axial end 28 of this element. The lip is spaced somewhat from the interrupted screw threads 35 in a direction away from the second axial end 29 and is of generally shallow and frusto conical configuration. The lip having a central circular opening 41 spaced somewhat further axially from the second end than the periphery of the lip. The sleeve, the interrupted screw threads, the lip, and the wings 33 are, preferably, of unitary construction.

The device 10 has a cylindrical tubular extension 45 which is mounted on the thread cleaning element 25 for rotation about the axis 26 and extends therealong coaxially with the first element. The extension has an axial end portion 47 extended within the opening 41 of the thread cleaning element from the first axial end 28 thereof toward the interrupted screw threads 35. This end portion is provided with an annular groove 48 which rotationally receives the lip 40 peripherally of such opening. The extension and the thread cleaning element are thus connected for rotation relative to each other about such axis. The extension has another portion or shank 51 extended externally of the thread cleaning element from the first end 28 thereof oppositely of the second end 29 thereof. The extension is provided with a wing 53 extended diametrically through the shank remotely from the thread cleaning element. This wing projects oppositely from the extension and is fixedly mounted thereon so that the wing is manually graspable to rotate the extension relative to such element.

The device 10 has a bar or face cleaning element 60 fixedly mounted on the end portion 47 of the extension 45 for rotation therewith relative to the thread cleaning element 25 about the axis 26. This bar is sometimes referred to in the claims as a second element of the device and extends diametrically of the thread cleaning element. The bar has opposite ends 62 spaced a distance approximately equal to the major diameter of the screw threads 15 of the coupling 12. The bar has a planar side 63 disposed in a plane normal to such axis. This side is closely adjacent to the interrupted screw threads 35 in a direction axially thereof. It is evident that such side extends from the end portion 47 of the extension and is disposed toward the interrupted screw threads. This side thus defines a pair of linear edges 64 of the bar, and these edges extend substantially normal to and radially oppositely from the axis 26 in axially adjacent relation to the interrupted screw threads. It is evident that these edges, being linear, conform to the planar face 19 of the coupling 12. It is also evident that the extension serves to mount the bar on the thread cleaning element for rotation relative thereto about such axis with the linear edges extended radially of such axis in axially adjacent relation to the interrupted screw threads. It is apparent that the wing 53 is manually graspable for rotating the bar relative to the thread cleaning element.

OPERATION

The operation of the described embodiment of the subject invention is believed to be clearly apparent and is briefly described at this point. When the device 10 is utilized to clean a coupling 12 in which the screw threads 15 and the face 19 are both dirty and/or corroded, the first step is screw threadably to engage, in the usual manner, the interrupted screw threads 35 of the thread cleaning element 25 with the coupling screw threads. The axes 16 and 26 are then substantially coincident and such engagement rotates the cleaning edges 38 of the interrupted screw threads about these axes relative to the coupling and engages these edges with the helical coupling surface 17 to scrape dirt and corrosion therefrom. The wings 33 provide sufficient leverage, when grasped manually, for rotation of the thread cleaning element, so that little effort is required to clean the coupling threads even if they are very dirty or highly corroded.

The thread cleaning element 25 is then rotated to draw it onto the coupling 12 to a position relative thereto depicted in FIG. 1 in which the side 63 of the bar 60 engages the coupling face 19. It is evident that engagement of the interrupted screw thread 35 and of the device 10 with the coupling screw threads so that the axes 16 and 26 are coincident and serve to bring the plane of the edges 64 substantially into parallel alignment with the plane of the coupling face. With this side and the face so engaged and aligned, the extension 45 is manually rotated by grasping the wing 53 so that the cleaning edges 64 of the bar scrape dirt and corrosion from the coupling face. This wing provides sufficient leverage so that dirt and corrosion are easily removed from the face by manual rotation of the extension. It is evident that the extension serves to mount the cleaning edge 64 in a disposition to engage the coupling face in cleaning relation when the bar 60 is rotated about the axes 16 and 26 relative to the thread cleaning element with the surface 37 thereof engaged with the coupling surface 17 and with these axes disposed in substantially coincident relation.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A device for cleaning a coupling, the coupling having a surface circumscribing a predetermined axis of the coupling and a face disposed in a predetermined relation to the axis and the device comprising a first element having a surface conforming to the surface of the coupling and circumscribing a predetermined axis of the device, said surface defining a cleaning edge disposed to engage said surface of the coupling in cleaning relation when the surface of the element is disposed at the surface of the coupling and said axes are disposed in substantially coincident relation and the first element is rotated about said axes relative to the coupling; a second element defining a cleaning edge conforming to the face of the coupling; and means for mounting the second element on the first element for rotation relative thereto about the predetermined axis of the device with the cleaning edge of the second element disposed to engage the face of the coupling in cleaning relation when the second element is rotated about said axis relative to the first element, when said surface of the first element is disposed at said surface of the coupling, and when said axes are disposed in substantially coincident relation.

2. The device of claim 1 wherein said surface of the coupling is a surface of a screw thread and wherein said surface of the first element is a surface of an interrupted screw thread mating with said screw-threaded surface of the coupling and wherein the cleaning edge of said surface of the first element is defined by an interruption of said interrupted screw thread.

3. The device of claim 2 wherein said face of the coupling is annular and axially facing and is disposed in axially adjacent relation to said surface of coupling and wherein said edge of the second element extends radially from the predetermined axis of the device.

4. A device for cleaning a coupling, the coupling having external screw threads circumscribing a predetermined axis of the coupling and an annular planar face circumscribing said axis and disposed substantially in a plane normal thereto, the face being disposed in axially adjacent relation to said screw threads and facing axially thereof and the device comprising A. a thread cleaning element having internal, interrupted screw threads mating with said screw threads of the coupling and circumscribing a predetermined axis of the device;

B. manually graspable means mounted on and externally of the thread cleaning element for rotating said element relative to the screw threads of the coupling;

C. a face cleaning element having a linear edge;

D. means for mounting the face cleaning element on the thread cleaning element for rotation relative thereto about the axis of the device with the rear end extended rearwardly of such axis in axially adjacent relation to the internal, interrupted screw threads; and E. manually graspable means for rotating the face cleaning element relative to the thread cleaning element.

5. A device for cleaning a hose coupling or the like, the device comprising:

A. a tubular element circumscribing a predetermined axis, the element having a predetermined first axial end and an axially open second axial end;

B. internal, interrupted screw threads mounted within such element about such axis and extended axially from such second end toward such first end;

C. means mounted on the tubular element externally thereof for manual grasping to rotate such element;

D. an extension mounted on the tubular element for rotation relative thereto about such axis, the extension being disposed along such axis and having one portion extended within the tubular element from the first end thereof toward the screw threads thereof and having another portion extended externally of the tubular element from the first end of such element oppositely of the second ends thereof;

E. means mounted on said another portion of the extension for manual grasping to rotate the extension about such axis relative to the tubular element; and F. a bar mounted on such one portion of the extension for rotation therewith relative to the tubular element, the bar having a linear edge extended substantially normal to such axis and disposed toward the interrupted screw threads in axially adjacent relation thereto.

* * * * *